United States Patent
Sierawski (10) Patent No.: US 8,190,213 B2
(45) Date of Patent: May 29, 2012

(54) METHOD AND APPARATUS FOR ONE-CLICK REMINDER CREATION

(75) Inventor: Jeff Sierawski, Boynton Beach, FL (US)

(73) Assignee: Motorola Mobility, Inc., Libertyville, IL (US)

(*) Notice: Subject to any disclaimer, the term of this patent is extended or adjusted under 35 U.S.C. 154(b) by 714 days.

(21) Appl. No.: 12/342,442

(22) Filed: Dec. 23, 2008

(65) Prior Publication Data

US 2010/0159978 A1 Jun. 24, 2010

(51) Int. Cl.
*H04M 1/00* (2006.01)
(52) U.S. Cl. .................... 455/567; 455/550.1
(58) Field of Classification Search ............... 455/550.1, 455/567
See application file for complete search history.

(56) References Cited

U.S. PATENT DOCUMENTS

| | | | |
|---|---|---|---|
| 6,301,338 B1 * | 10/2001 | Makela et al. | 379/88.21 |
| 7,233,229 B2 * | 6/2007 | Stroupe et al. | 340/309.7 |
| 7,512,400 B2 * | 3/2009 | Starbuck et al. | 455/414.1 |
| 2001/0029175 A1 * | 10/2001 | Sellen et al. | 455/412 |
| 2001/0029194 A1 | 10/2001 | Ketola et al. | |
| 2005/0243979 A1 | 11/2005 | Starbuck et al. | |
| 2006/0176278 A1 | 8/2006 | Mathews et al. | |
| 2007/0004383 A1 | 1/2007 | Agozo | |
| 2007/0154008 A1 | 7/2007 | Pomerantz et al. | |
| 2007/0280459 A1 | 12/2007 | Yee et al. | |
| 2008/0132209 A1 | 6/2008 | Willey | |

OTHER PUBLICATIONS

Patent Cooperation Treaty, International Search Report and Written Opinion of the International Searching Authority for International Application No. PCT/US2009/065601, Jun. 30, 2011, 9 pages.

* cited by examiner

*Primary Examiner* — Khai M Nguyen (57) ABSTRACT

An electronic communication device (100) is configured to automatically create reminders in a reminder application (206) in response to received communications, interruption events, or other occurrences. For example, when an interruption event is detected, a soft key (103,104) is configured with a reminder creation function. Upon actuation of the soft key (103,104) the reminder application (206) automatically creates a reminder by associating a communication type and a device identifier with the reminder. A user is then able to select the reminder from a list. At selection, an actuation application (208) launches an application corresponding to the communication type and initiates a communication with the device identifier.

20 Claims, 9 Drawing Sheets

METHOD AND APPARATUS FOR ONE-CLICK REMINDER CREATION

BACKGROUND

1. Technical Field

This invention relates generally to portable electronic devices having reminder or to-do lists, and more particularly to a portable communication device having soft-keys configurable as to create one-click reminders in a reminder list in response to incoming communications or interrupt events.

2. Background Art

Multi-tasking is often seen as a requirement in modern society. With ever increasing demands for a person's time, it seems today that unless multiple tasks are being performed simultaneously, there is simply not enough time in the day to get everything done. Consequently, people are often doing two things at once. When trying to complete two tasks simultaneously, it is easy to focus on completing one task while forgetting to complete the other.

This is especially true in the world of interpersonal communication. Not too long ago people had only a simple telephone with no answering machine. When someone called, if the recipient was home and available, they accepted the call. If they were not home, or were not available, the caller would simply call back.

Today, however, people often carry sophisticated communication devices having telephone functionality, text and multimedia messaging capability, e-mail capability, and Internet access. While this added functionality is convenient, it can come the price of constant availability to others. A recipient today may receive text messages from a first person, e-mail messages from a second person, telephone calls from a third person, and so forth. It is not uncommon for multiple communications to arrive simultaneously. In most cases, all of these communications are received by a single electronic device. Responding to these communications can be a frazzling experience.

One problem associated with prior art devices is that they are generally only configured to process one communication event at a time. For example, if a user is typing a text message to a first party, and a telephone call comes in from a second party, the user has two choices: the user can accept the call and lose the text message, or the user can continue the text message and miss the call. If the user chooses the first option, the user must remember to return to the text messaging application to complete the correspondence with the first party. If the user chooses the latter option, the user must remember to return to the telephony application to call the second party back. If the user forgets to do either, a variety of problematic conditions can arise—the user may miss an important communication or engagement, a particular party may be offended by the user's delayed response or lack of response, and so forth.

There is thus a need for an improved communication device that assists people in remembering interrupted communications.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to creating reminders in response to incoming electronic communications in accordance with embodiments of the invention. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of the creation of reminders in a reminder application as described herein. As such, these functions may be interpreted as steps of a method to perform the creation of reminders in a list. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide methods and devices for creating a reminder for a follow-up activity in response to an incoming communication, or in response to an interrupted communication. The reminder can be created for an alternate application within a primary application. For instance, if a user is typing a text message to a first party, and an incoming call from a second party is received, embodiments of the invention provide for configuring a soft key with a reminder function. When the user actuates the soft key, a reminder is created having communication type information and device identifier information associated therewith. Illustrating with the example above, if the user wishes to continue typing the text message, actuation of the reminder key will automatically create a reminder in a reminder application. That reminder may include text such as "Return telephone call to Sue" and will include the communication type, e.g., a telephone call, and a device identifier, such as the caller's telephone number, device address, contact information, and so forth.

Examining the example the other way, if the user wishes to take the telephone call, actuation of the soft key will create a reminder to complete the interrupted text message. Such a reminder may include text such as "Complete text message to Bob," and will include the communication type—text message—and device identifier, such as Bob's mobile telephone number, e-mail address, or other identifier. In one embodiment, partial completion information will be associated with the reminder. For instance, if the interrupted message included "Are you coming by on" as entered by the user, one embodiment of the invention associates this partial completion information with the reminder so that it will not be lost.

In one embodiment, the reminders are stored in a list of a reminder application. Upon the user selecting a particular reminder in the reminder list, the reminder application launches an application configured for communication in accordance with the communication type. In one embodiment, the reminder application then pre-configures a communication in the launched application with the device identifier by addressing the communication accordingly. If the reminder is to return a call to Bob, the reminder application may launch the telephony application and automatically present Bob's information from an address book application. Alternatively, the reminder application may automatically dial Bob's telephone number.

Where partial completion information is stored, the reminder application can populate the partial completion information into the communication. This can be presented to the user as a partially-populated form. From the example above, the reminder application may populate a text message addressed to Bob with the text "Are you coming by on" so that the user need only enter "Christmas Day" rather than the entire text.

By creating the reminders, embodiments of the present invention provide a system and method that helps a user remember to answer incoming communications. As the reminders are stored in an electronic to-do list within the device, it is no longer necessary for the user to make mental notes throughout the day regarding whom to call, e-mail, or text. The user simply accesses the reminder list. Further, return communications are expedited in that embodiments of the reminder list can launch applications, address communications, and even pre-populate the communication (where applicable) with partial completion information.

While embodiments of the present invention will be described herein for simplicity as being responsive to incoming communications and interruption events, it will be clear to those of ordinary skill in the art having the benefit of this disclosure that the invention is not so limited. For instance, as described herein, embodiments of the present invention could be configured to automatically create reminders in the event that a communication operation is aborted. For instance, if a user waiting for a train is typing a text message when the train arrives, embodiments of the invention could create a reminder to complete the text message when the user exits the messaging application to board the train. Similarly, when the user launches the messaging application, a soft key can be configured with the reminder function so that the user would be able to create the reminder at any time while working in the messaging application.

Figure 1:
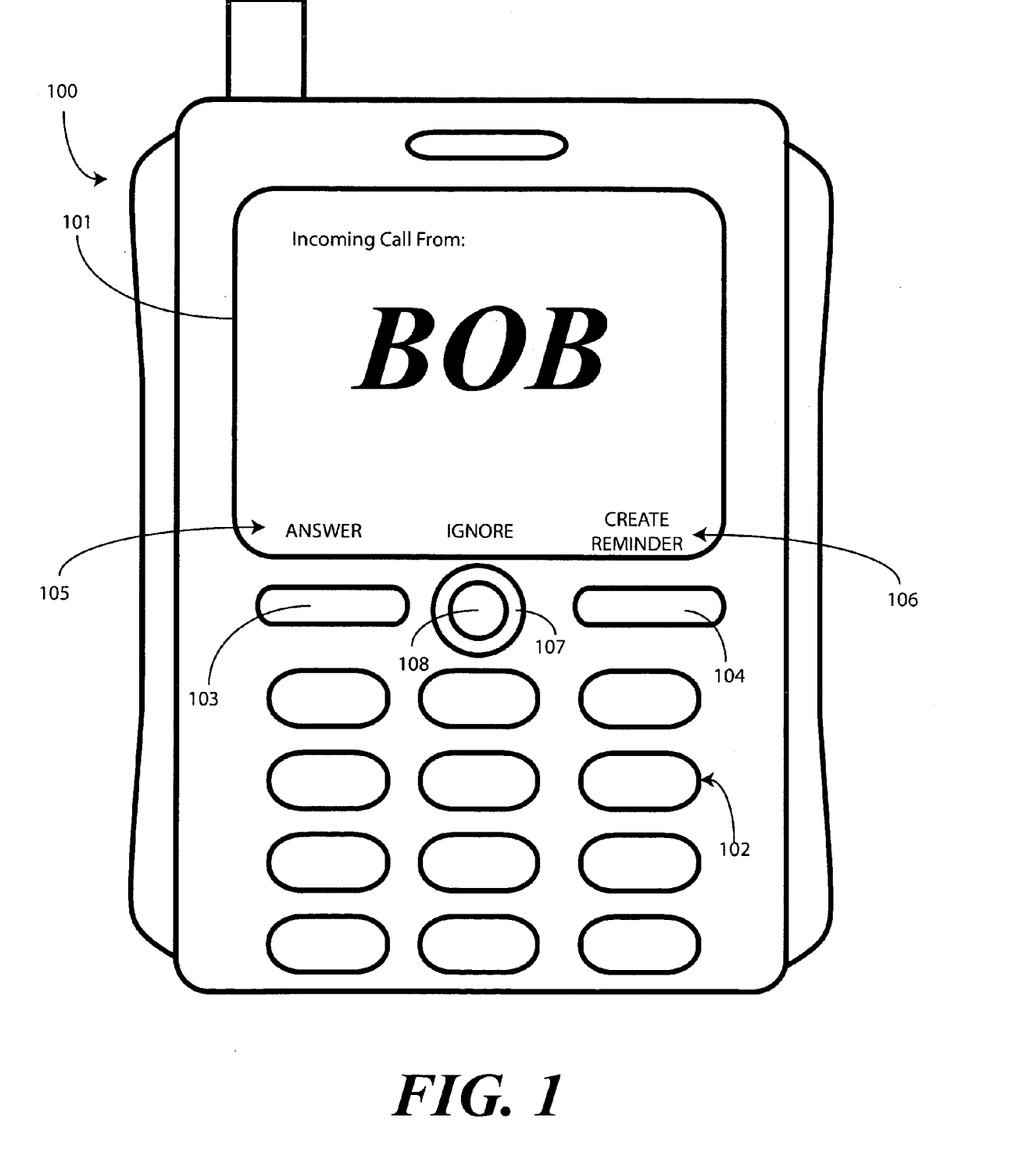
FIG. 1 illustrates one exemplary electronic communication device in accordance with embodiments of the invention.

Turning now to FIG. 1, illustrated therein is one embodiment of an electronic communication device 100 in accordance with embodiments of the invention. While a mobile telephone will be used herein for discussion purposes as the electronic communication device 100, it will be clear to those of ordinary skill in the art having the benefit of this disclosure that the invention is not so limited. The automatic reminder creation methods described herein could equally be used in other communication devices, such as a camera phone, a smart phone, a personal digital assistant, a two-way radio, a gaming device, a laptop computer, or almost any portable electronic device having communication capabilities.

The electronic communication device 100 includes a user interface for presenting information to a user and receiving information from the user. For instance, in FIG. 1 the user interface includes a display 101 for presenting information to the user and a keypad 102 for receiving information from the user. The keypad 102 may be a standard 12-key telephone pad. Alternatively, a full QWERTY keypad may be provided. Other devices, such as a touch sensitive display, may also be used.

In addition to the keypad, one or more soft keys 103,104 are provided. A "soft key" as used herein is a key whose function changes based upon the application being run, activity being performed, or situation at hand. By way of example, in a telephony application, soft key 103 may be configured to access an address book, while soft key 104 may be configured to mute a call. Then, when in a messaging application, soft key 103 may be configured to insert predefined text, while soft key 104 is configured to send the message.

To alert the user as to what function is associated with each soft key 103,104 the display 101 includes soft key designation areas 105 and 106. These areas are updated with information identifying the particular mode or function of each soft key 103,104. As the mode of the electronic communication device 100 changes, or as an application running therein dictates, the function of these soft keys 103,104 can change as well.

In addition to the soft keys 103,104, a navigation key 107 may be included for navigating through the various applications of the device. Further, the navigation key 107 may include a third soft key 108 for making function selections as well.

In one embodiment, the electronic communication device 100 includes one or more communication applications. In one embodiment, the electronic communication device 100 is therefore capable of providing multiple modes of operation. For example, the electronic communication device 100 may operate in telephony mode. Alternatively, the electronic communication device 100 may operate in a messaging mode to transmit and receive SMS messages, text messages, MMS, messages, e-mail correspondence, and so forth. In the data mode of operation, the electronic communication device 100 may be used as a portable data machine to transmit forms and other information to a remote device.

Figure 2:
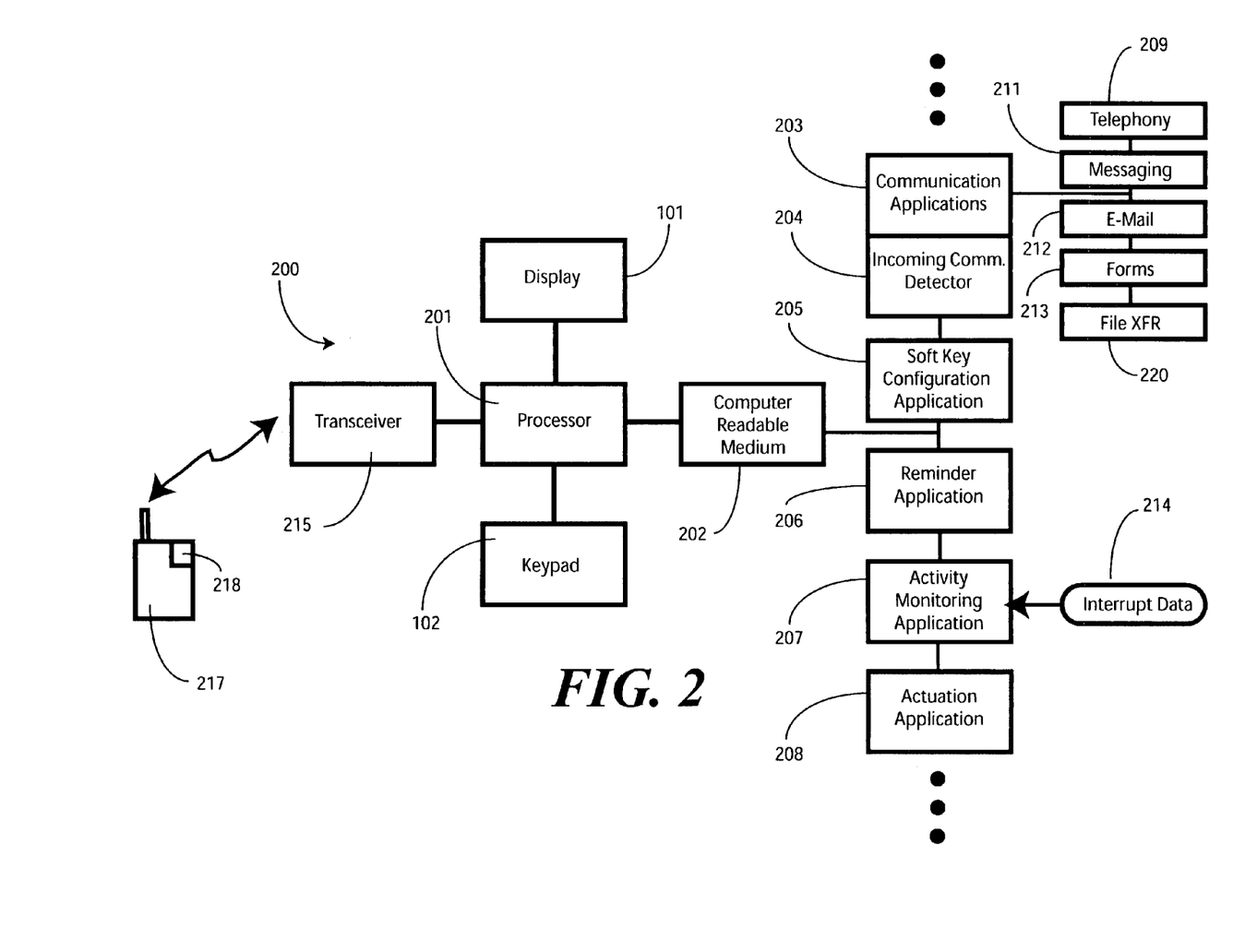
FIG. 2 illustrates a schematic block diagram of one exemplary electronic communication device in accordance with embodiments of the invention.

Turning now to FIG. 2, illustrated therein is a schematic block diagram 200 of an electronic communication device (100) in accordance with embodiments of the invention. The schematic block diagram 200 illustrates the internal circuitry and software or firmware modules of the electronic communication device (100).

The display 101 and keypad 102 are coupled to, and operable with, a control device, such as processor 201. The processor 201 is configured to operate the various functions of the electronic communication device (100), and to execute software or firmware applications and modules stored in a computer readable medium, such as memory 202. The processor 201 executes this software or firmware to provide device functionality.

The various applications in the illustrative embodiment of FIG. 2 include communication applications 203, which may include an incoming communication detector 204, a soft key configuration application 205, a reminder application 206, an activity monitoring application 207, and an actuation application 208. The applications shown in FIG. 2 are illustrative only. Embodiments of the present invention may use various combinations of applications, including subsets of the applications listed in FIG. 2. Further, other applications may be added in further increase device functionality.

The communication applications 203 are configured to conduct electronic communications with a remote device 217 having a device identifier 218. Specifically, information is transmitted to and received from the remote device by way of a transceiver 215 that is operable with the processor 201. Each communication is transmitted or received in accordance with a communication type. The communication type will correspond to a particular application.

For instance, in one embodiment, the electronic communication device (100) is configured with one or more communication applications. These communication applications can include a telephony application 209 for making telephone calls, a messaging application 211 for sending SMS, MMS, text, or other messages, an electronic mail application 212 for transmitting e-mail correspondence, and a data transfer module 213 for transmitting data such as forms having user entered data therein. The communication type associated with each communication application depends upon the application. For the telephony application 209, a communication type may be telephone calls or two-way radio correspondence. For the messaging application 211, the communication type may be a SMS message, a MMS message, or another type of message. For the electronic mail application 212, the communication type may be an e-mail, FTP, facsimile, or other communication. For the data transfer module 213, the communication type may be packets of data, or completed forms. It will be clear to those of ordinary skill in the art having the benefit of this disclosure that these communication types are illustrative only, and that other applications and corresponding communication types may be used with embodiments of the invention as well.

Where included, the incoming communication detector 204 is configured to detect not only that an incoming communication is being received, but also the communication type and the device identifier from which the communication is being received. For example, where a telephone call is being received, the incoming communication detector 204 identifies the incoming data as a voice telephone call. The incoming communication detector 204 is further configured to determine a device identifier associated with the incoming call, such as a telephone number of the caller.

The soft key configuration application 205 is configured, in one embodiment, to adapt soft keys (103,104) to particular functions as described above. As also described above, embodiments of the invention provide methods and devices to automatically generate reminders for follow-up activities. As such, in one embodiment the soft key configuration application 205 is configured to adapt a soft key (103,104) to a reminder creation function. This can happen, for example, in response to the incoming communication detector detecting that a communication is being received. This can also be done within an application to permit a user to set a reminder at any time. Additionally, this can be done when an interruption event occurs, such as the user boarding a train and aborting the messaging application as described above.

The reminder application 206 is configured to automatically create a reminder for the user. This automatic creation of the reminder can be triggered, in one embodiment, by actuation of the reminder creation function. A user actuates the reminder creation function, in one embodiment, by actuating the soft key corresponding with the reminder creation function. In one embodiment, the reminder application 206 is configured to present the reminder with other reminders as a list on the display 101 of the user interface.

When this occurs, in one embodiment the reminder application 206 creates the reminder by associating a communication type and a device identifier with the reminder. For example, if the reminder being created is to return an otherwise unanswered telephone call, the reminder application can associate the communication type, i.e., a telephone call, and a device identifier, i.e., the caller's telephone number, with the reminder. As such, when the user selects the reminder from a list in the reminder application later, this information can be used to streamline the communication initiation process. For example, where the reminder is to return a call, the information can be used to dial the device identifier without the need of the user manually locating it in an address book application.

In one embodiment, an activity monitoring application 207 is configured to monitor activity within one of the communication applications 203 to determine a status. For instance, if the user is composing an e-mail in the electronic mail application 212, the activity monitoring application 207 may monitor the data being entered by the user. This data may be logged or otherwise stored in the memory 202. Where the activity is prematurely ended, the activity monitoring application 207 can record the entered information or interrupt information 214 from the incomplete communication in the memory 202. As such, when the user selects the reminder from a list in the reminder application later, this interrupt information 214 can be used to streamline the communication initiation process. For example, where the reminder is to finish a text message, the interrupt information 214 can be used to partially populate a form, such as an e-mail template so the user need not re-enter the information. Further, the device identifier may be used to address the e-mail template without the need of the user manually locating it in an address book application.

Examples of interrupt information 214 include a partially completed communication form addressed to a recipient having a recipient identifier. In the illustrative case of an e-mail communication, the partially completed form can be a partially completed e-mail, with the recipient identifier being the recipient's e-mail address. In one embodiment, the reminder application is configured to automatically create the reminder as a completion reminder by associating this interrupt information 214 with the reminder.

In such a scenario, the reminder application 206 could use this interrupt information 214 to save the user some time when the user selects the "Remember to Complete E-mail to Bob" reminder from its reminder list. For instance, when the user selects the completion reminder from the reminder list, the reminder application 206, in one embodiment, delivers a reminder signal 219 to the actuation application 208. While the actuation application 208 is shown in FIG. 2 as a separate application, the actuation application 208 can also be incorporated with the reminder application 206 as an integrated module.

Upon receiving the reminder signal 219, which is indicative of the specific reminder being selected, the actuation application 208 in one embodiment is configured to launch an application corresponding to the communication type set forth in the reminder. Continuing the example from the preceding paragraph, the actuation application would launch the electronic mail application 212 as the communication type of the reminder is an e-mail. The actuation application 208 can further be configured to automatically initiate the communication by launching a blank e-mail form, addressing the communication to Bob, and then populating the e-mail form with the interrupt information 214 so as to present a partially populated form to the user on the display (101).

In another embodiment, interrupt information 214 can include a file transfer communication addressed to the user, with the user's identifier serving as the recipient identifier. For example, the user may receive a notification from a service provider asking whether they would like to upgrade the firmware on their electronic device. However, the user may wish to upgrade the firmware at a later time. In this embodiment, the reminder application can be configured to automatically create the reminder as a completion reminder by associating this interrupt information 214 with the reminder.

In such a scenario, the reminder application 206 could use this interrupt information 214 to save the user some time when the user selects the "Remember to Upgrade Firmware" reminder from its reminder list. For instance, when the user selects the completion reminder from the reminder list, the reminder application 206, in one embodiment, delivers a reminder signal 219 to the actuation application 208.

Upon receiving the reminder signal 219, the actuation application 208 in one embodiment is configured to launch a file transfer application 220 as the communication type of the reminder is to transfer a file. The actuation application 208 can further be configured to automatically initiate the communication by launching reply message or file pulling communication, addressing the communication to a service provider, and then populating the e-mail form with the interrupt information 214 so as to present a partially populated form to the user on the display (101).

Turning now to FIGS. 3-6, illustrated therein are various use cases of embodiments of the invention. Each of these use cases is illustrative of a particular embodiment only, and is not intended to be limiting.

Figure 3:
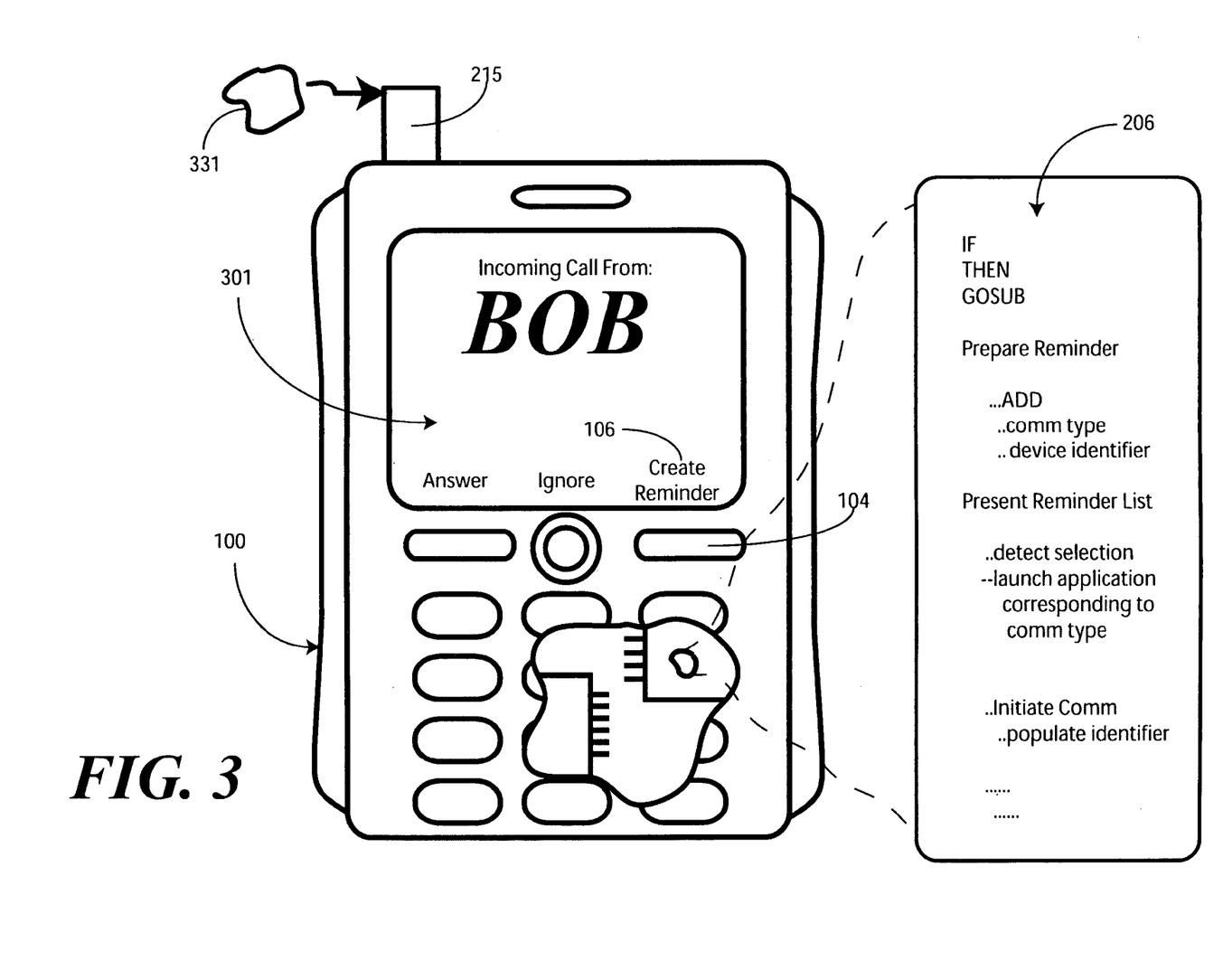
FIGS. 3, 4, 5, and 6 illustrate various exemplary use cases for an exemplary electronic communication device in accordance with embodiments of the invention.

Beginning with FIG. 3, the electronic communication device 100 is shown as being in an idle mode. An idle indication 301, such as a wallpaper image, screensaver, or other information, is present on the display 101.

The incoming communication detector (204) detects an incoming communication 331 and determines both the communication type and the device identifier associated with the incoming communication. For the purposes of FIG. 3, presume that the incoming communication 331 is a telephone call from Bob. This information—the communication type being a telephone call and the device identifier being Bob's telephone number—can be stored, for example, in a memory (202).

The soft key configuration application 215 then configures soft key 104 with a reminder creation function. This function is indicated to the user in soft key designation area 106. Where the user elects not to take the telephone call, but wants a reminder automatically created, the user actuates the soft key 104, thereby launching the reminder application 206. The reminder application then automatically creates a reminder by associating the communication type and device identifier with the reminder. This reminder is added to a list, which will be described in FIG. 5.

Figure 4:
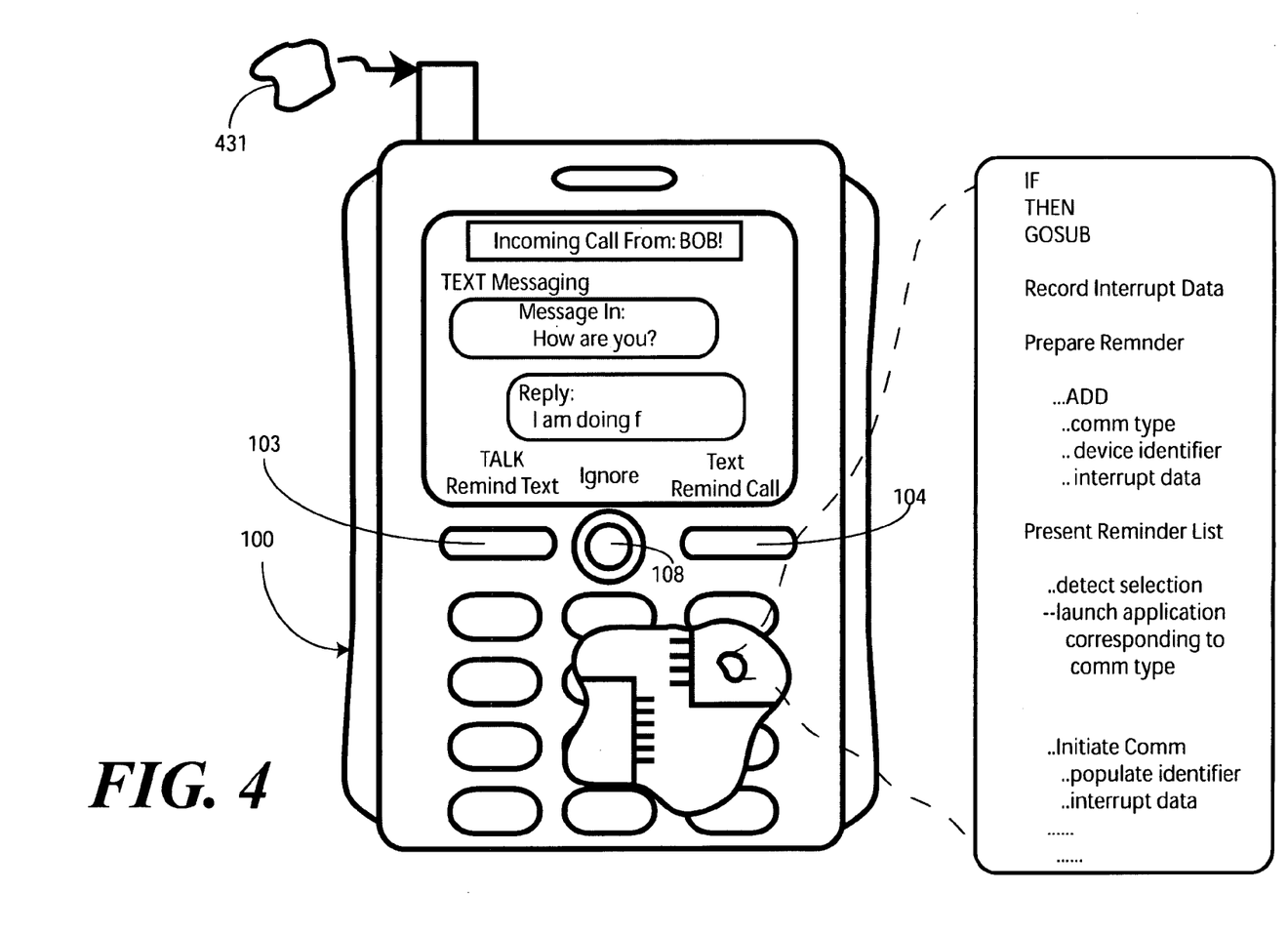

Turning now to FIG. 4, illustrated therein is a use case where the user is working in an active application on the electronic communication device 100 when an incoming communication 431 is received. For the purposes of illustration with respect to FIG. 4, the active application is the messaging application (211), as the user is typing a text message. Further, the incoming communication 431 is again a telephone call from Bob.

In this use case, each soft key 103,104 has been configured with a reminder creation function. Specifically, soft key 103 has been configured with a reminder creation function that allows the user to accept the call and to automatically create a reminder of the text message, while soft key 104 is configured with a reminder creation function that allows the user to complete the text message and to automatically create a reminder to return the call. Note that other soft keys, such as soft key 108 can be created to provide alternate options, such as ignoring Bob's call.

Where the user actuates soft key 103, Bob's call will be accepted and a reminder will be created of the text message. Thus, the activity monitoring application 207 is invoked to record the interrupt information (214), which in this case is a partially completed text message. This interrupt information (214) is stored in memory (202). The reminder application (206) then automatically creates a reminder to complete the text message. In one embodiment, this includes associating the communication type (text message), the device identifier of the intended recipient (the person to whom the text message was addresses), and the interrupt information (the partially completed text).

Figure 5:
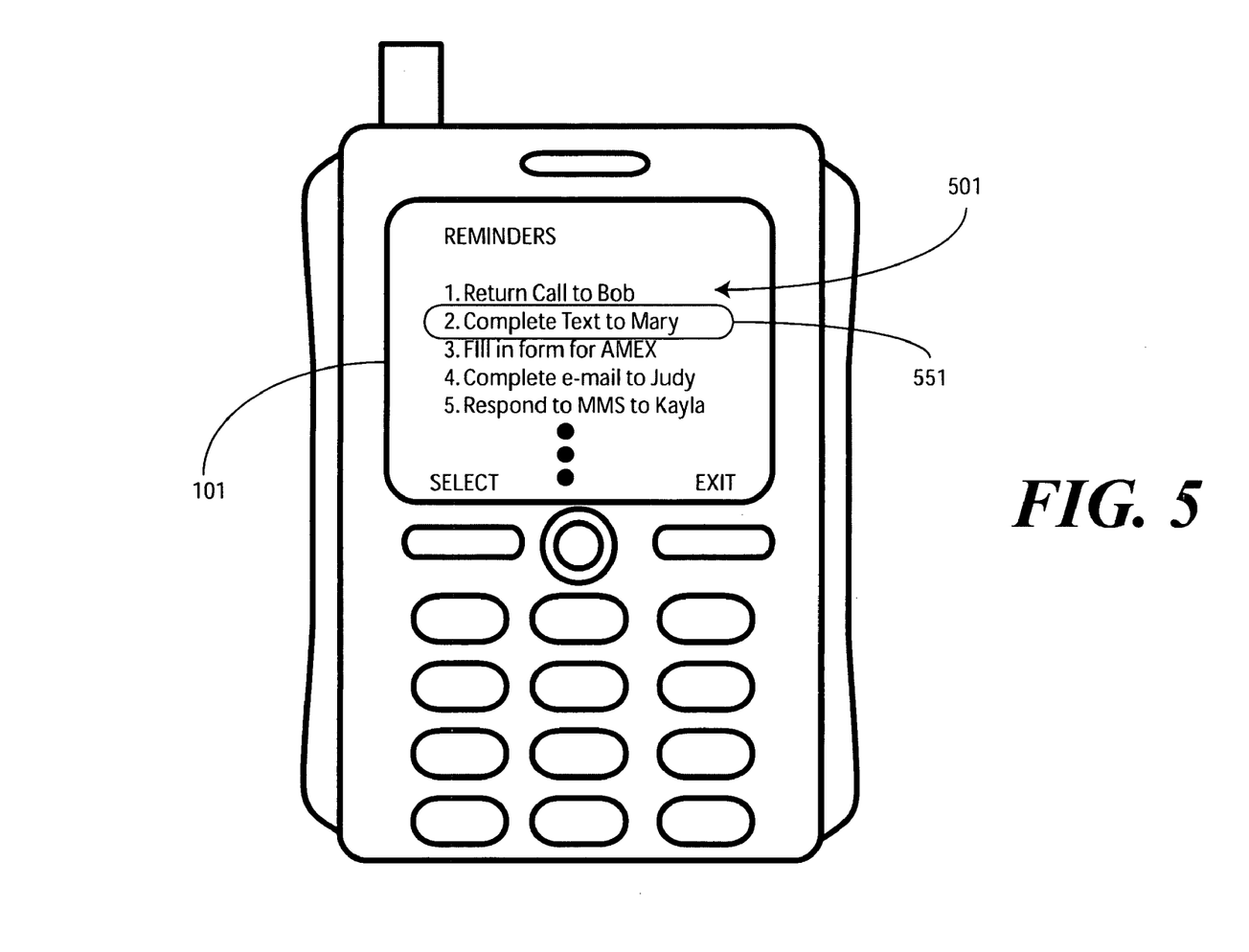

Later, when the user wishes to complete the text message the user may select the reminder from a list (FIG. 5). In response, this illustrative example, the actuation application (208) launches the messaging application, initiates a communication by presenting a text message form, and in one embodiment partially populates the form by addressing the message to the intended recipient and adding the interrupt information (214) to the form.

Now consider another option for the user when the incoming communication 431 was detected: finishing the message and automatically creating a reminder of the call. In this case, the reminder application (206) would operate in substantially the same fashion as with FIG. 3. Specifically, upon actuation of soft key 104, the reminder application (206) automatically creates a reminder by associating the communication type and device identifier with the reminder.

Turning now to FIG. 5, illustrated therein is a reminder list 501 presented to a user on the display 101. As noted above, in one embodiment, the reminders are added to a list in the reminder application (206). In one embodiment, this is done on a first-in-first-out basis. The list 501 can then be presented to the user on the display 101, as shown in FIG. 5. By selecting a particular reminder 551, the user can, in one embodiment, launch an application corresponding to a communication type and device identifier. Where the reminder was created from a partially completed activity, such as a partially completed e-mail or text message when an interrupt event occurred, selection of the particular reminder 551 can also cause the partial completion information to be populated in an initiated communication as shown in FIG. 6.

Figure 6:
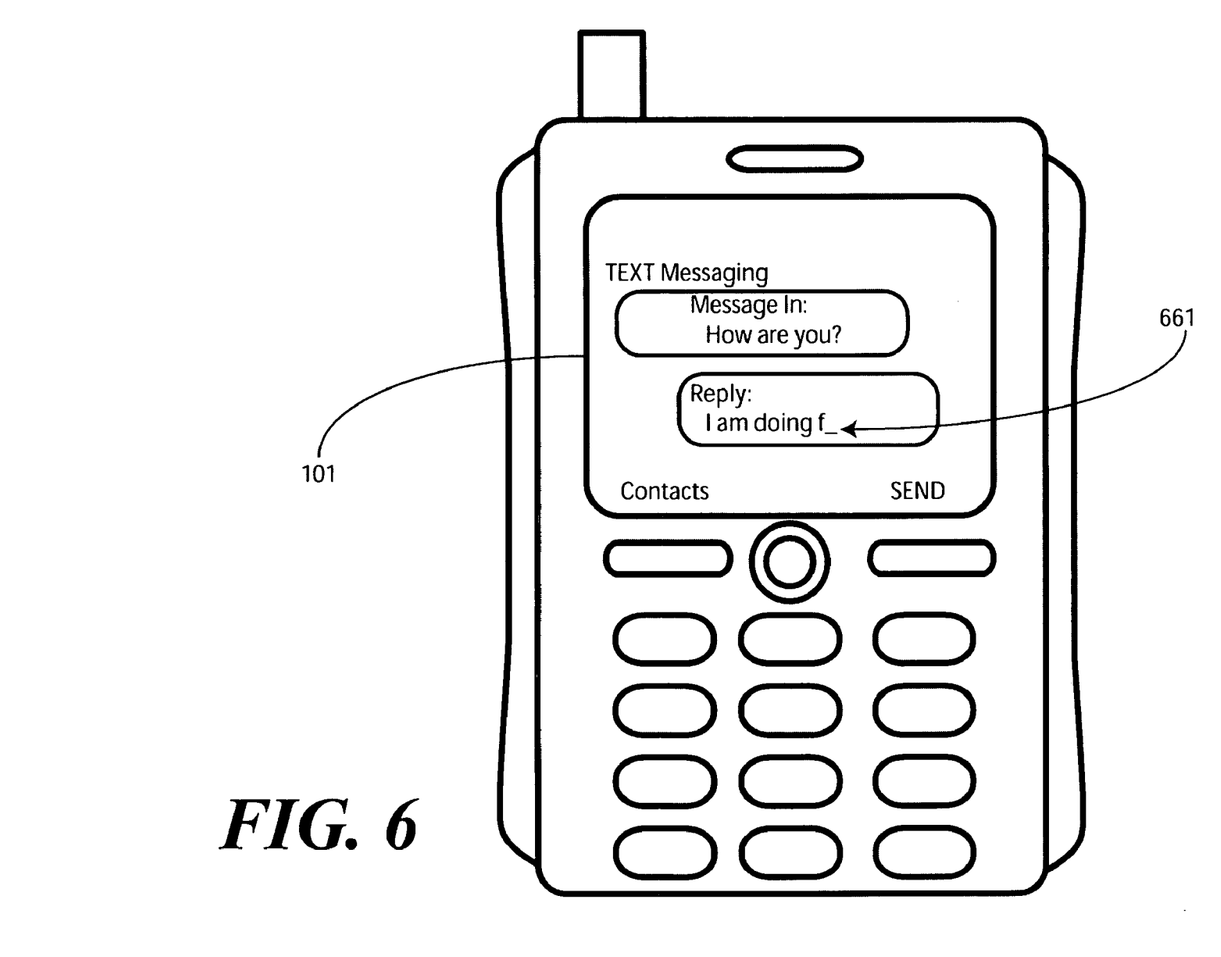

Turning now to FIG. 6, upon selection of the particular reminder (551), the actuation application has configured the messaging application (211) in accordance with the partial completion information 661. The resulting partially completed activity is then presented to the user on the display 101, thereby returning the user to the place at which the interrupt event occurred.

Figure 7:
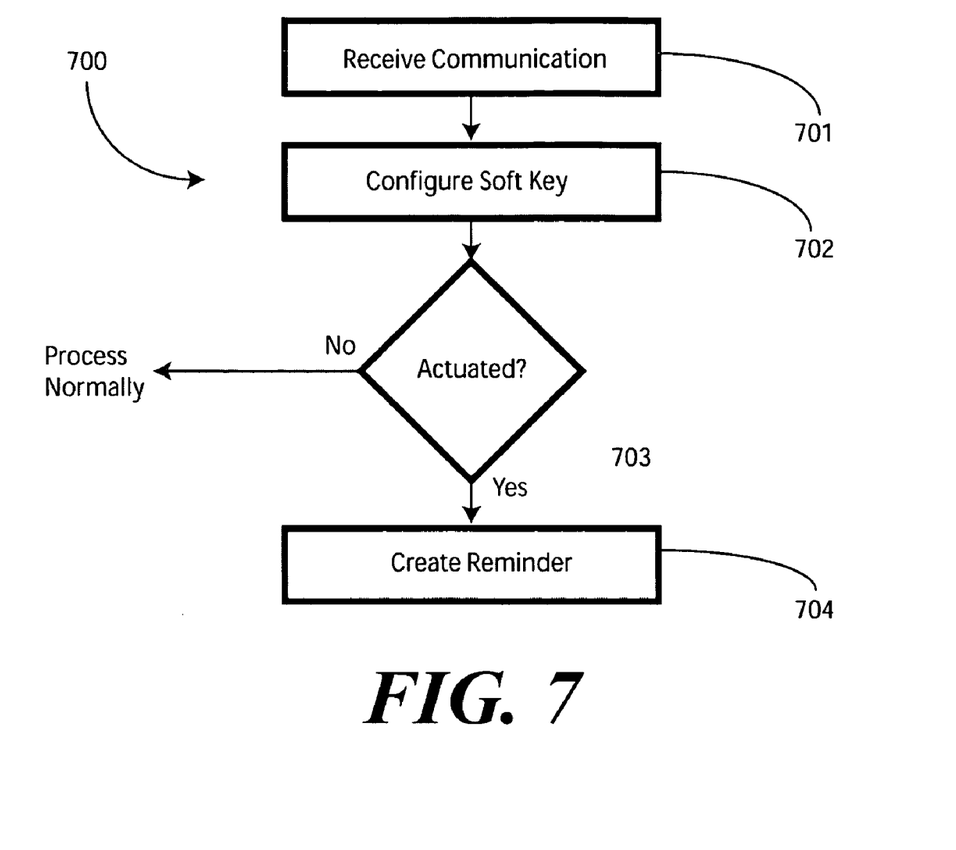
FIG. 7 illustrates one method of creating a reminder for a follow-up activity in accordance with embodiments of the invention.

Turning now to FIG. 7, illustrated therein is one method 700, suitable for use in a portable communication device, for creating a reminder for a follow-up activity. In one embodiment, the method 700 can be used within an active application, such as a messaging application (211), to create a reminder for a follow-up activity in an alternate application, such as a telephony application (209).

Figure 8:
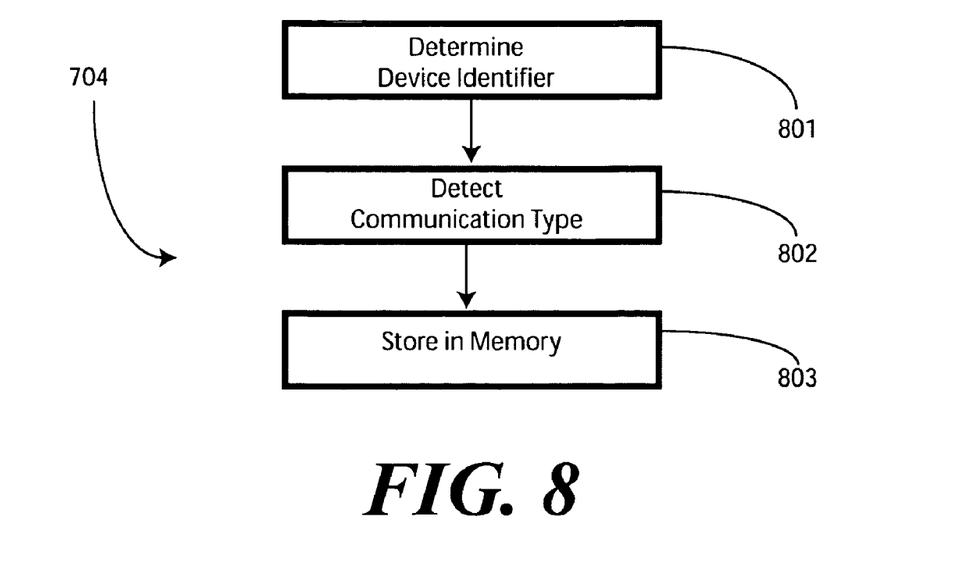
FIG. 8 illustrates exemplary steps for detecting a communication in accordance with embodiments of the invention.

At step 701, the method 700 receives an incoming communication, such as a telephone call, electronic mail, or other communication. Turning briefly to FIG. 8, illustrated therein are exemplary steps that can be included with the step 701 of receiving an incoming communication from FIG. 7. Specifically, at step 801, an incoming communication detector (204) is configured to identify a communication type associated with the incoming communication. At step 802, the device identifier associated with the incoming communication is determined. This information can then be stored in a memory (202) at step 803.

Figure 9:
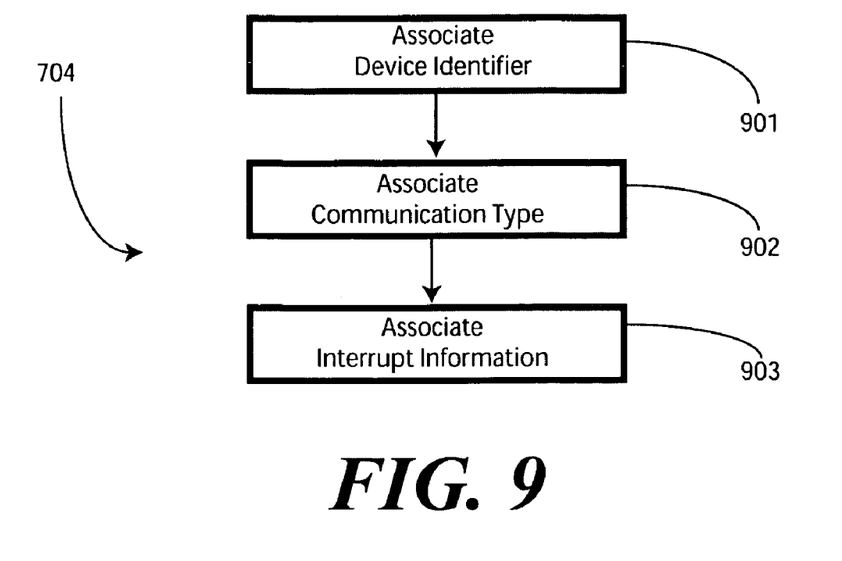
FIG. 9 illustrates exemplary steps for creating a reminder in accordance with embodiments of the invention.

Turning now back to FIG. 7, upon receiving the incoming communication, at step 702 a soft key is configured with a reminder function. The fact that the soft key is thus configured can be presented to the user on a soft key designation area (106). Where the user fails to actuate the soft key, the process proceeds as it would without embodiments of the invention.

Where the user does actuate the soft key, at step 704 a reminder is automatically created. Turning briefly to FIG. 9, illustrated therein are exemplary steps for the step 704 of creating the reminder. For example, in one embodiment, creation of the reminder the reminder comprises associating the communication type (determined in step 801 of FIG. 8) with the reminder at step 901. Creation of the reminder can also include associating the device identifier (determined in step 802 of FIG. 8) with the reminder at step 902. In one embodiment, steps 901 and 902 can be done by adding the communication type and the device identifier to a pre-populated reminder form and storing the reminder in a list of the reminder application (206). For instance, where the communication type is a telephone call and the device identifier is Bob's telephone number, the pre-populated reminder form may be "Return [BLANK 1] to [BLANK 2]," where [BLANK 1] is populated with the communication type and [BLANK 2] is populated with Bob's name, which is determined by referencing the device identifier in the user's address book.

The user may be notified of the creation of the reminder (step 704 of FIG. 7). For example, the display (101) may momentarily present a notification such as "Reminder Created!" Alternatively, the reminder can be created in the background. This latter embodiment may be useful, for example, where the active application is a video telephone call. The user may not want the video stream to be interrupted when creating the reminder. As such, in one embodiment, the creation of the reminder occurs in without interrupting a user interface presentation of the active application.

Figure 10:
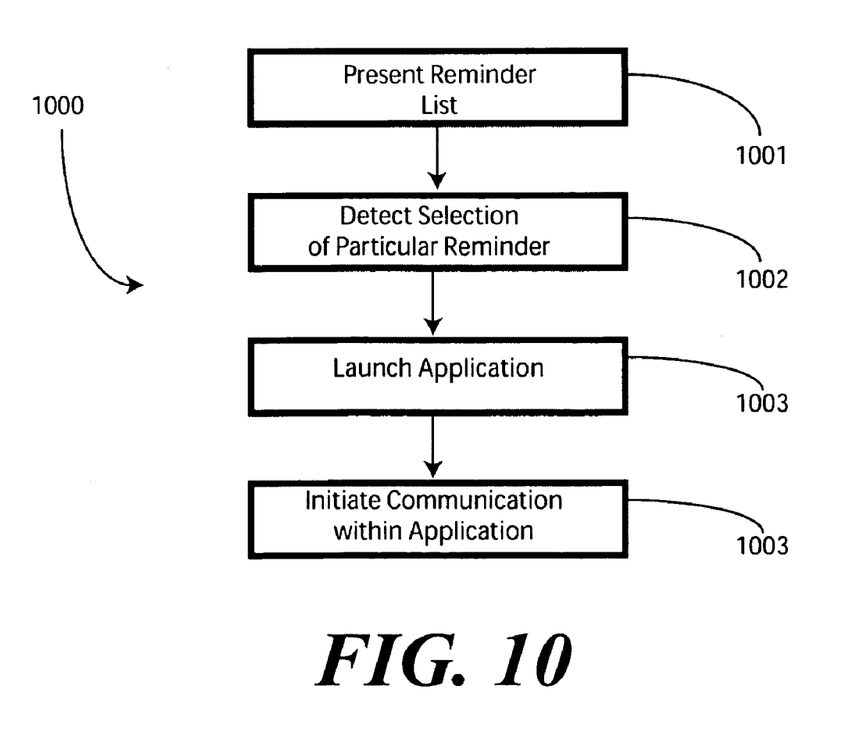
FIG. 10 illustrates one method for selecting a reminder from a reminder list in accordance with embodiments of the invention.

Turning now to FIG. 10, illustrated therein is a method 1000 of completing an activity by selecting a reminder from a list in accordance with embodiments of the invention. Specifically, at step 1001, the method 1000 presents a created reminder with other reminders as a list on the user interface. At step 1002, a user selection of a particular reminder is received.

At step 1003, the method 1000 launches an application corresponding to the communication type associated with the particular reminder. For instance, if the reminder is to "Return telephone call to Bob," step 1003 may launch the telephony application (209). At step 1004, the method 1000 initiates a communication corresponding to the communication type within the launched application. In one embodiment, this step 1004 includes addressing the communication with the device identifier.

Figure 11:
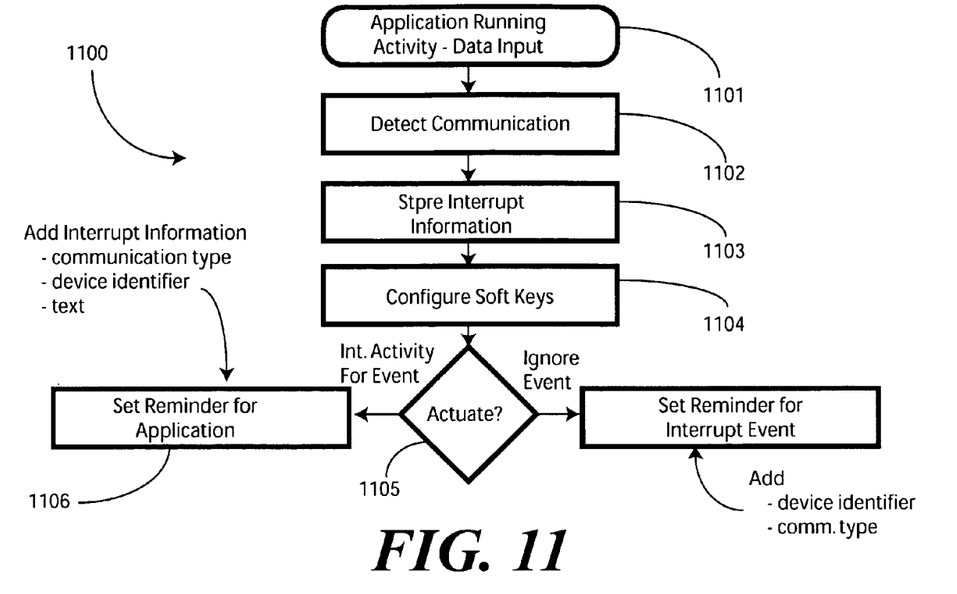
FIG. 11 illustrates one method of creating a reminder for a follow-up activity in accordance with embodiments of the invention.

Turning now to FIG. 11, illustrated therein is a method 1100 in a portable communication device of creating a reminder for a follow-up activity. While the method 1100 of FIG. 11 can work in response to an incoming communication, such need not be the case. The method 1100 may be used in conjunction with a prematurely aborted application or activity, such as the user boarding the train described above. In one embodiment, the method 1100 is used within a particular application to create a reminder for a follow-up activity from a partially completed activity, such as partially completing a multimedia message or e-mail.

At state 1101, an application is active. The user may or may not be working on an activity within that application. At step 1102, an interruption event is detected. The interruption event could be an incoming communication. Alternatively, the interruption event could simply be the user terminating the active application or otherwise prematurely aborting the activity running within the application.

At step 1103, the method 1100 stores partial completion information from the partially completed activity within the application when an interruption event occurs. As described above, this can be storing data received from the user interface, such as the text in a partially completed message. Other examples of partially completed activities include partially completed multimedia messages, partially completed forms, or partially completed e-mails intended for other recipients and their remote communication devices.

At step 1104, a soft key is configured with a reminder creation function. Actuation of the reminder creation function is detected at decision 1105. Where partial completion information is involved, upon actuation of the soft key the method 1100 automatically creates the reminder in a reminder application by associating the partial completion information with the reminder at step 1106. Step 1106 may also include association of the communication type and recipient identifier associated with the partially completed activity with the reminder.

Figure 12:
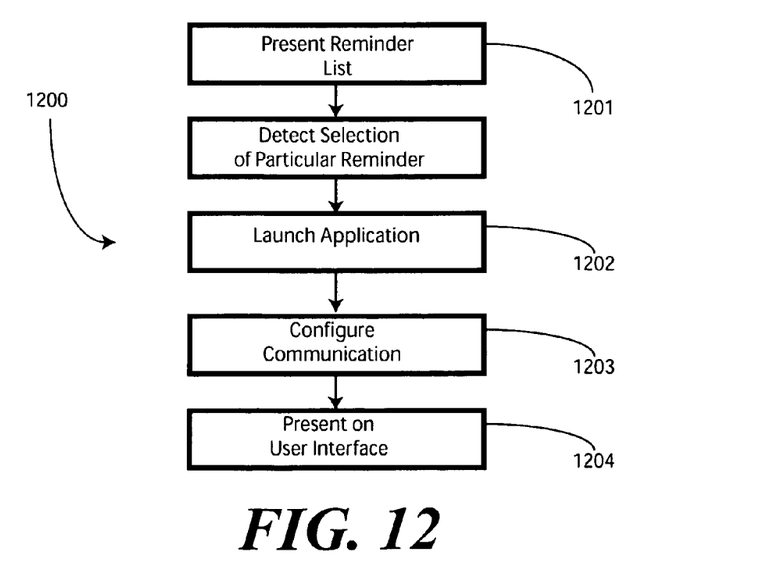
FIG. 12 illustrates one method for selecting a reminder from a reminder list in accordance with embodiments of the invention.

Turning now to FIG. 12, illustrated therein is a method 1200 of completing an activity where partial completion information is involved by selecting a reminder from a list in accordance with embodiments of the invention. Specifically, at step 1201, the method 1200 presents a created reminder with other reminders as a list on the user interface. At step 1202, a user selection of a particular reminder is received.

At step 1203, the method 1200 launches an application corresponding to the communication type associated with the particular reminder. For instance, if the reminder is to "Complete e-mail to Bob," step 1203 may launch the electronic mail application (212). At step 1204, the method 1200 initiates a communication corresponding to the communication type within the launched application. In one embodiment, this step 1204 includes addressing the communication with the device identifier.

In one embodiment, this step 1204 includes configuring the application in accordance with the partial completion information. For instance, a blank e-mail form may be launched and populated with the partial completion information. Alternatively, the partially completed activity itself, having been saved in memory (202), may be presented to the user on the display (101). In one embodiment, the step of configuring the application in accordance with the partial completion information comprises presenting the partially completed activity within the launched application.

As illustrated and described herein, embodiments of the invention provide methods and devices to enrich functionality of a portable communication device with an automatic, customizable reminder list. Creation of reminders is automated to save the user time and effort. For example, if a user's electronic communication device is receiving a call, the user can choose to dismiss the call but also add a reminder to return the call later. The addition of the reminder can be accomplished with a single actuation of a soft key or other user input device. Similarly, a reminder to return an email can be created with a single-click action. If a local or web-based form is dismissed before completion, a reminder to complete it can be automatically added to the reminder list.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a portable communication device, within an active application of the portable communication device, of creating a reminder for a follow-up activity in an alternate application of the portable communication device, the method comprising the steps of:

receiving an incoming communication having a communication type associated therewith from a remote communication device having a device identifier associated therewith;

upon receiving the incoming communication, configuring a soft key of the portable communication device with a reminder function; and upon a one-click actuation of the soft key, automatically creating the reminder to respond to the incoming communication in a reminder application by associating at least the communication type and the device identifier with the reminder.

2. The method of claim 1, wherein the alternate application comprises one of a telephony application, a messaging application, an e-mail application, a file transfer application, or a form completion application.

3. The method of claim 1, wherein the step of automatically creating the reminder comprises adding the communication type and the device identifier to a pre-populated reminder form and storing the reminder in a list of the reminder application.

4. The method of claim 3, wherein the step of automatically creating the reminder occurs in a first-in-first-out basis.

5. The method of claim 1, wherein the step of automatically creating the reminder occurs in without interrupting a user interface presentation of the active application.

6. The method of claim 1, further comprising the steps of:
receiving a selection of the reminder in the reminder application;
launching the alternate application; and
initiating a communication corresponding to the communication type by addressing the communication with the device identifier.

7. A method in a portable communication device, within an application, of creating a reminder for a follow-up activity from a partially completed activity, the method comprising the steps of:
storing partial completion information from the partially completed activity within the application when an interruption event occurs;
configuring a soft key of the portable communication device with a reminder creation function in response to the interruption event; and
upon actuation of the soft key, automatically creating the reminder in a reminder application of the portable communication device by associating the partial completion information with the reminder.

8. The method of claim 7, wherein the step of automatically creating the reminder comprises associating a communication type and a recipient identifier associated with the partially completed activity with the reminder.

9. The method of claim 7, wherein the partially completed activity comprises one of a partially completed text message, a partially completed multimedia message, a partially completed form, a partially completed file transfer, or a partially completed e-mail intended for a remote communication device.

10. The method of claim 9, wherein the partial completion information comprises data received from a user interface of the portable communication device for the partially completed activity.

11. The method of claim 7, further comprising the steps of:
receiving a selection of the reminder in the reminder application;
launching the application; and
configuring the application in accordance with the partial completion information.

12. The method of claim 11, wherein the step of configuring the application in accordance with the partial completion information comprises presenting the partially completed activity within the application.

13. An electronic communication device having a reminder application configured to automatically generate reminders for follow-up activities, comprising:
   a processor configured to execute one or more applications stored in a memory;
   one or more communication applications, each communication application being configured to conduct communications with a remote device having a device identifier by transmission of information in accordance with a communication type;
   an incoming communication detector configured to detect incoming communication and to determine the communication type and the device identifier associated therewith; and
   a soft key configuration application configured to adapt a soft key to a reminder creation function in response to the incoming communication detector detecting the incoming communication;
   wherein the reminder application is responsive to a single click of the reminder creation function and is configured to automatically create a reminder by associating the communication type and the device identifier with the reminder.

14. The electronic communication device of claim 13, further comprising an activity monitoring application configured to monitor a communication status of in the one or more of the one or more communication applications, and to record interrupt information from an incomplete communication of one communication type.

15. The electronic communication device of claim 14, wherein the interrupt information comprises a partially completed communication form addressed to a recipient having a recipient identifier, wherein the reminder application is configured to automatically create a completion reminder by associating the partially completed communication form and the recipient identifier with the completion reminder.

16. The electronic communication device of claim 15, wherein the reminder application is configured to deliver a reminder signal when the completion reminder is selected by a user, wherein the electronic communication device further comprises an actuation application, responsive to the reminder signal, and configured to launch a communication application corresponding to the one communication type and to present the partially completed communication form.

17. The electronic communication device of claim 14, wherein the one or more communication applications comprise at least a telephony application and a messaging application.

18. The electronic communication device of claim 14, wherein the reminder application is configured to deliver a reminder signal when the reminder is selected by a user, wherein the electronic communication device further comprises an actuation application, responsive to the reminder signal, and configured to launch a communication application corresponding to the communication type and to prepare a communication by addressing the communication with the device identifier.

19. The electronic communication device of claim 18, wherein the communication type comprises written communication, wherein the communication comprises a partially populated form.

20. The electronic communication device of claim 14, wherein the reminder application is configured to present the reminder with other reminders in a list on a user interface.

\* \* \* \* \*